United States Patent
Kuo

(10) Patent No.: US 9,317,062 B2
(45) Date of Patent: Apr. 19, 2016

(54) TOUCH DISPLAY DEVICE USING LIGHT TO DEBOND TOUCH MODULE FROM DISPLAY MODULE

(71) Applicant: Acer Incorporated, New Taipei (TW)

(72) Inventor: Jin-Ting Kuo, New Taipei (TW)

(73) Assignee: Acer Incorporated, New Taipei (TW)

( * ) Notice: Subject to any disclaimer, the term of this patent is extended or adjusted under 35 U.S.C. 154(b) by 61 days.

(21) Appl. No.: 14/447,647

(22) Filed: Jul. 31, 2014

(65) Prior Publication Data

US 2015/0062462 A1 Mar. 5, 2015

(30) Foreign Application Priority Data

Sep. 2, 2013 (TW) .............................. 102131576 A

(51) Int. Cl.
*G06F 3/041* (2006.01)
*G06F 1/16* (2006.01)

(52) U.S. Cl.
CPC ............ *G06F 1/1601* (2013.01); *G06F 1/1637* (2013.01); *G06F 1/1643* (2013.01); *G06F 3/0412* (2013.01)

(58) Field of Classification Search
CPC .................. G06F 3/041–3/047; G06F 1/1601; G06F 1/1637; G06F 1/1643
See application file for complete search history.

(56) References Cited

U.S. PATENT DOCUMENTS

| | | | | |
|---|---|---|---|---|
| 8,674,954 B2 * | 3/2014 | Kwon | .................... | H01L 27/323 345/173 |
| 2010/0117985 A1 * | 5/2010 | Wadia | ..................... | G06F 3/044 345/174 |

OTHER PUBLICATIONS

Ki-Duk Kim et al.; "A capacitive touch controller robust to display noise for ultrathin touch screen displays," in Solid-State Circuits Conference Digest of Technical Papers (ISSCC), 2012 IEEE International , vol., No., pp. 116-117, Feb. 19-23, 2012 doi: 10.1109/ISSCC.2012.6176943.*
Taiwanese 102131576, includes Non-Final action dated Sep. 18, 2015, a machine-generated English language translation of same, and a list of "A" references.*

* cited by examiner

*Primary Examiner* — Larry Sternbane
(74) *Attorney, Agent, or Firm* — Jianq Chyun IP Office

(57) ABSTRACT

A touch display device including a touch module, a display module, and a bonding member is provided. The touch module includes a touch panel and a film member bonded to each other. The bonding member is connected between the touch module and the display module. The bonding member forms a gap between the touch module and the display module. An outer light source is adapted to be disposed in the gap, wherein the outer light source irradiates the bonding member through the touch module and debonds the bonding member from the touch module.

10 Claims, 6 Drawing Sheets

TOUCH DISPLAY DEVICE USING LIGHT TO DEBOND TOUCH MODULE FROM DISPLAY MODULE

CROSS-REFERENCE TO RELATED APPLICATION

This application claims the priority benefit of Taiwan application serial no. 102131576, filed on Sep. 2, 2013. The entirety of the above-mentioned patent application is hereby incorporated by reference herein and made a part of this specification.

BACKGROUND

1. Field of the Invention

The present invention generally relates to a display device, and in particular, to a touch display device.

2. Description of Related Art

In recent years, due to the rapid development of the information technologies, wireless mobile communications and information appliances, and other applications, the input interfaces of many information products have been changed from the conventional keyboard or mouse, etc. to the touch display panel in order to be more convenient, more compact in volume and more user-friendly. In terms of the designs of the general touch display panels, the current touch display panels may be roughly categorized into resistive type, capacitive type, optical type, acoustic wave type, and electromagnetic type, etc., according to the design principles of the touch sensing modes, among which the resistive type and the capacitive type are the mainstream.

Take a capacitive touch display device as an example, it is basically composed of a touch module and a display module, which are generally bonded by an adhesive. Besides, roughly there are two types of bonding methods for bonding the adhesive, namely fully fitting and frame fitting, etc. Generally, the fully fitting is, for example, to laminate the adhesive (such as optical adhesive) between the touch module and the display module for bonding. However, bubbles may easily remain within the optical adhesive in the laminating process and cause poor yield. In addition, the frame fitting is, for example, to adhere the adhesive (such as optical adhesive) to the periphery of one of the touch module and the display module, and then laminate the other one on the adhesive, so that the touch module and the display module can be bonded to each other through the adhesive. Specifically, the frame fitting has better yield and low cost compared with the fully fitting.

However, when one of the touch module and the display module is broken, it is hard to depart the touch module and the display module, which are bonded to each other through the method described above, from the adhesive. Therefore, if an excessive force is applied, it will damage the touch module and the display module. In the prior art, a method of high-temperature heating or liquid nitrogen cryogenic processing is utilized to destroy the adhesion of the adhesive, so as to take the touch module and the display module apart, but at the same time, the high-temperature heating or the liquid nitrogen cryogenic processing, etc. are likely to damage the touch module and the display module or even cause permanent damage.

SUMMARY

The present invention provides a touch display device, in which an adhesive bonded between a touch module and a display module can be debonded by light irradiation, for easily debonding a touch panel from the display module and avoiding damage.

A touch display device of the present invention includes a touch module, a display module and a bonding member. The touch module includes a touch panel and a film member bonded to each other. The bonding member is connected between the touch module and the display module. The bonding member forms a gap between the touch module and the display module, and an outer light source is adapted to be disposed in the gap, wherein a light provided by the outer light source irradiates the bonding member through the touch module and debonds the bonding member from the touch module.

Based on the above, in the touch display device of the present invention, the touch module and the display module are bonded to each other by the bonding member disposed therebetween, wherein the bonding member is a light-to-heat conversion (LTHC) bonding member. Therefore, it is possible to debond the bonding member from the touch module by irradiating the bonding member with the light, which allows the user to debond the touch module from the display module without an excessive force, and thereby avoid damaging the touch module and the display module.

To make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain the principles of the present invention.

DESCRIPTION OF THE EMBODIMENTS

Figure 1:
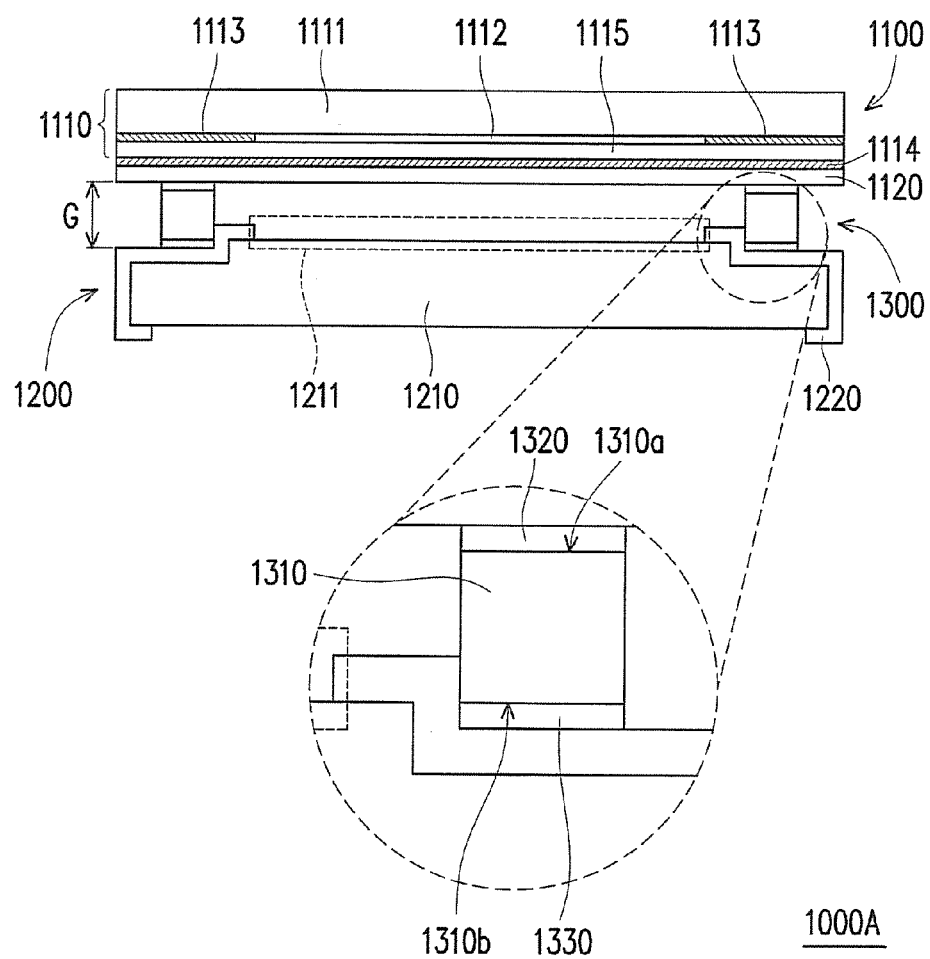
FIG. 1 is a diagram illustrating a touch display device according to an embodiment of the present invention.
Figure 2:
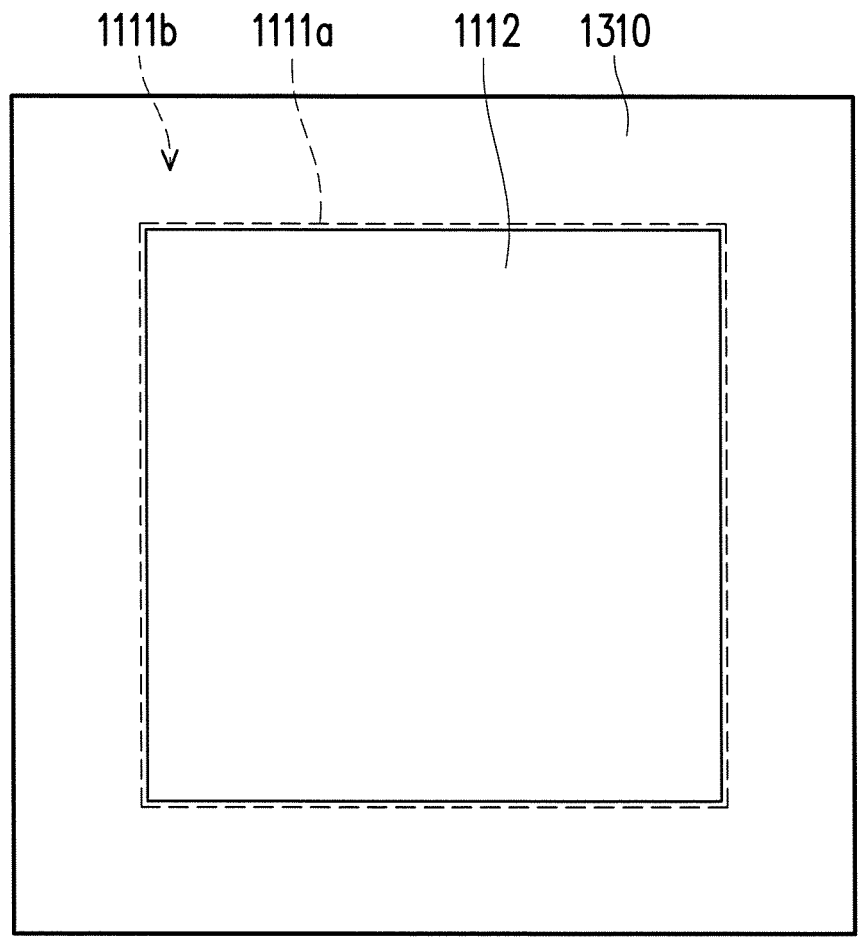
FIG. 2 is a top view diagram illustrating the touch display device of FIG. 1.

FIG. 1 is a diagram illustrating a touch display device according to an embodiment of the present invention. FIG. 2 is a top view diagram illustrating the touch display device of FIG. 1. Referring to FIG. 1 and FIG. 2, in the present embodiment, the touch display device 1000A includes a touch module 1100, a display module 1200 and a bonding member 1300. The touch module 1100 is, for example, a capacitive touch module or a resistive touch module, but the present invention is not limited thereto. The touch module 1100 includes a touch panel 1110 and a film member 1120 bonded to each other, wherein the touch panel 1110 includes a substrate 1111, and the substrate 1111 includes a touch region 1111*a* and a peripheral region 1111*b* which surrounds the touch region 1111*a*.

In general, the substrate 1111 may be a transparent substrate, and a material thereof is, for example, glass, quartz, organic polymer or other suitable materials. A circuit layer 1112 and an ink layer 1113 are disposed on the substrate 1111, wherein the circuit layer 1112 is formed in the touch region 1111a and is used to provide the function of touch sensing of the touch module 1100, and the ink layer 1113 is formed in the peripheral region 1111b and is, for example, a shielding material composed of colored resin, used to shield a circuit (not shown) preset in the peripheral region 1111b. The ink layer 1113 is formed on the substrate 1111 by a printing process, such as a gravure printing process, a screen printing process, a flexographic printing process, offset printing, a reverse printing process, or an ink jet printing process, etc.

The film member 1120 is a proof film and in particular a high transmittance proof film, for maintaining the display quality of the touch display device 1000A. In the present embodiment, the film member 1120 is bonded to a protective layer 1115 which covers on the circuit layer 1112 through an optical adhesive 1114. In general, a material of the proof film is, for example, PET, which is used to prevent the touch panel 1110 from breaking when the touch panel 1110 is subjected to an external force.

In the present embodiment, the bonding member 1300 is connected between the touch module 1100 and the display module 1200, to form a gap G between the touch module 1100 and a display module 1200. Specifically, the bonding member 1300 includes a first main body 1310, a first adhesive layer 1320 and a second adhesive layer 1330. The first main body 1310 includes a first surface 1310a and a second surface 1310b opposite to the first surface 1310a. The first main body 1310 is, for example, a flexible carrier used to carry the first adhesive layer 1320 and the second adhesive layer 1330, wherein the first adhesive layer 1320 is disposed on the first surface 1310a for bonding the film member 1120, and the second adhesive layer 1330 is disposed on the second surface 1310b for bonding the display module 1200.

Furthermore, the display module 1200 of the present embodiment includes a second main body 1210 and a fastener 1220, wherein the second main body 1210 is generally composed of members such as polarizers, filters, array glass substrates and backlight units, etc. The fastener 1220 covers an outer surface of the second main body 1210 to fix several members of the second main body 1210, and exposes a display region 1211 of the second main body 1210. The bonding member 1300 is bonded to the fastener 1220 with the second adhesive layer 1330 for bonding the display module 1200.

Figure 3:
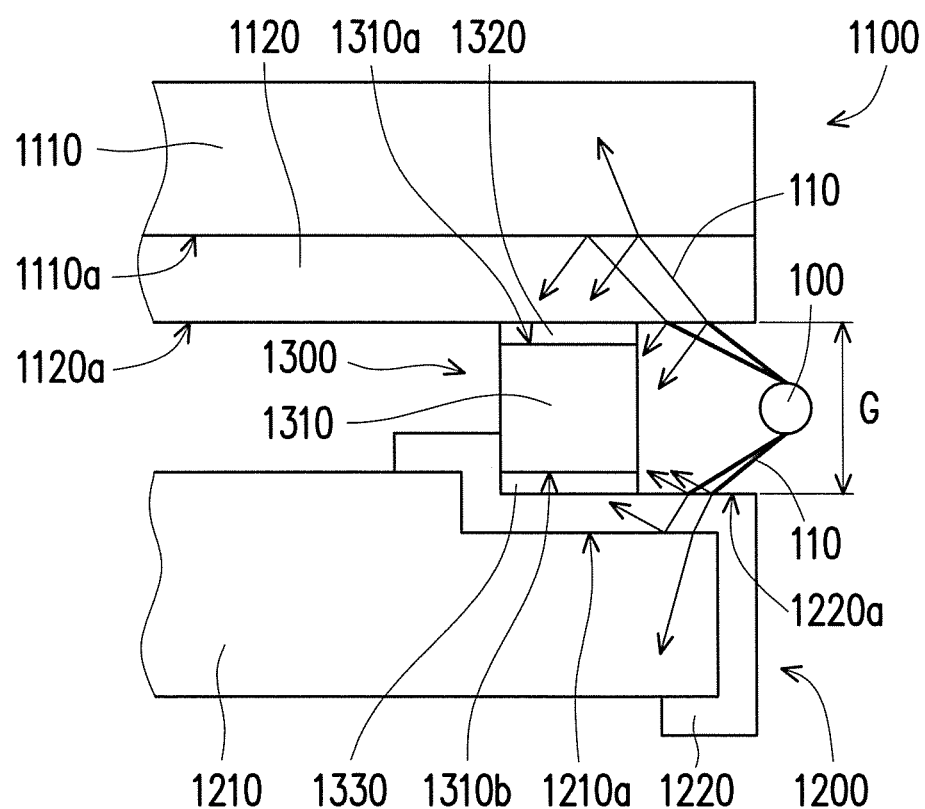
FIG. 3 is a partial enlarged view diagram illustrating the touch display device of FIG. 1.

FIG. 3 is a partial enlarged view diagram illustrating the touch display device of FIG. 1, wherein the circuit layer 1112, the ink layer 1113, the optical adhesive 1114 and the protective layer 1115 are omitted for the clarity and description. Referring to FIG. 3, in the present embodiment, the bonding member 1300 is a light-to-heat conversion (LTHC) bonding member. That is, the first adhesive layer 1320 and the second adhesive layer 1330 may change the characteristics thereof through light. Therefore, when an outer light source 100 is disposed in the gap G, the light 110 provided by the outer light source 100 irradiates the bonding member 1300 through the touch module 1100, so that the bonding member 1300 is debonded from the touch module 1100.

In the present embodiment, a refractive index of the touch panel 1110 is n1, a refractive index of the film member 1120 is n2, wherein n1 and n2 are different from each other. Therefore, when the light 110 irradiates a surface 1120a of the film member 1120, a portion of the light 110 is refracted at the surface 1120a and enters into the film member 1120, and the rest of the light 110 is reflected by the surface 1120a. Then, the light 110 refracted into the film member 1120 irradiates the touch panel 1110. Similarly, a portion of the light 110 is refracted at a surface 1110a of the touch panel 1110 and enters into the touch panel 1110, and the rest of the light 110 is reflected by the surface 1110a and irradiates the first surface 1310a after passing through the film member 1120, so that the first adhesive layer 1320 is debonded by light.

Further, the refractive index n2 of the film member 1120 is greater than the refractive index n1 of the touch panel 1110. Therefore, when the light 110 enters from the film member 1120 with the higher refractive index into the touch panel 1110 with the lower refractive index and an incident angle thereof is larger than a critical angle, a total reflection phenomenon is generated on the surface 1110a of the touch panel 1110, so that the totally reflected light 110 passes through the film member 1120 and irradiates the first surface 1310a so as to debond the first adhesive layer 1320. That is, with the aforementioned configuration, the present invention makes sure that, after the light 110 irradiates the touch module 1100, enough light 110 is reflected to the first surface 1310a, so as to debond the first adhesive layer 1320 from the touch module 1100.

Referring to FIG. 3, in the present embodiment, a refractive index of the fastener 1220 is n3, and a refractive index of the second main body 1210 is n4, and n3 and n4 are different from each other. Therefore, when the light 110 irradiates a surface 1220a of the fastener 1220, a portion of the light 110 is refracted at the surface 1220a and enters into the fastener 1220, and the rest of the light 110 is reflected by the surface 1220a. Then, the light 110 refracted into the fastener 1220 irradiates the second main body 1210. Similarly, a portion of the light 110 is refracted at a surface 1210a of the second main body 1210 and enters into the second main body 1210, and the rest of the light 110 is reflected by the surface 1210a and irradiates the second surface 1310b after passing through the fastener 1220, so that the second adhesive layer 1330 is debonded by the light.

Further, in the present embodiment, the refractive index n3 of the fastener 1220 is greater than the refractive index n4 of the second main body 1210. Therefore, when the light 110 enters from the fastener 1220 with the higher refractive index into the second main body 1210 with the lower refractive index and an incident angle thereof is larger than the critical angle, a total reflection phenomenon is generated on the surface 1210a of the second main body 1210, and thereby the totally reflected light 110 irradiates the second surface 1310b after passing through the fastener 1220, so that the second adhesive layer 1330 is debonded by the light. That is, with the aforementioned configuration, the present invention makes sure that, after the light 110 irradiates the display module 1200, enough light 110 is reflected to the second surface 1310b, so as to debond the second adhesive layer 1330 from the display module 1200.

Based on the above, the first adhesive layer 1320 and the second adhesive layer 1330 of the bonding member 1300 receive the better light illumination efficiency through the above path, and thereby change the layer characteristics (viscosities), so as to debond the touch module 1100 and the display module 1200 successfully for avoiding damage.

Figure 4:
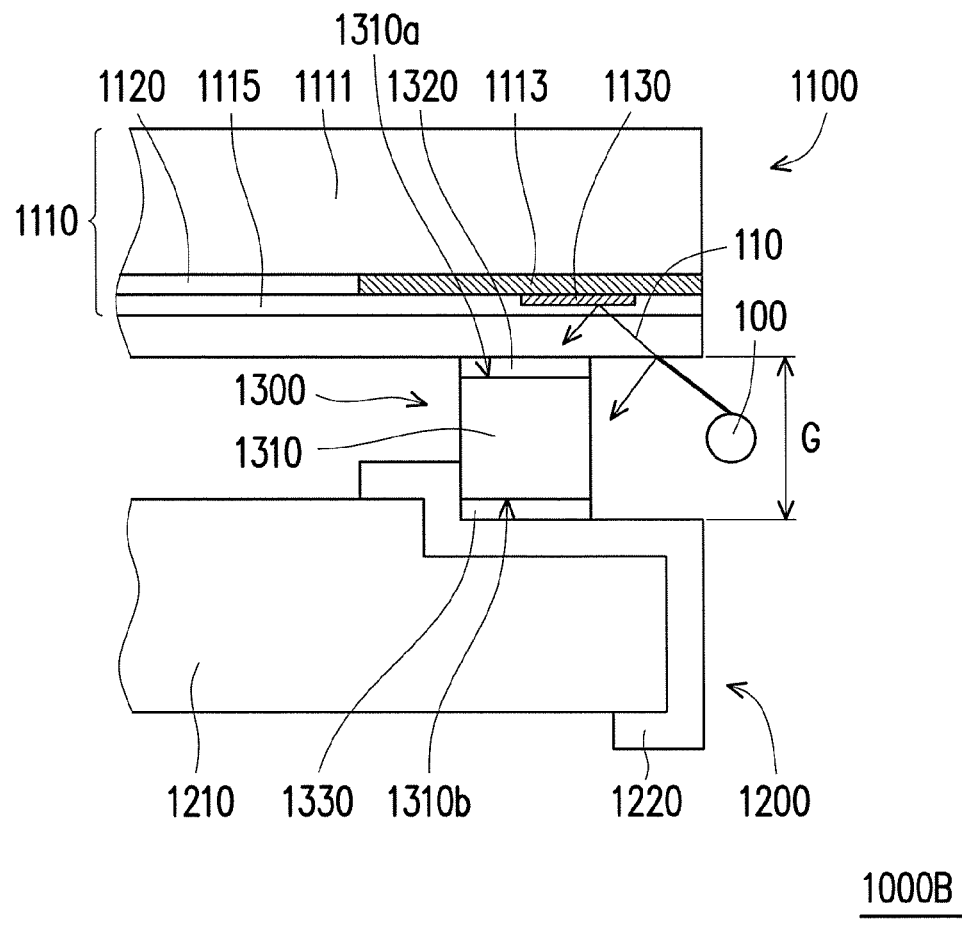
FIG. 4 is a partial enlarged view diagram illustrating a touch display device according to another embodiment of the present invention.

FIG. 4 is a schematic diagram illustrating a touch display device according to another embodiment of the present invention, wherein the optical adhesive 1114 is omitted for the clarity and description. Referring to FIG. 4, the difference between the touch display device 1000B of FIG. 4 and the touch display device 1000A of FIG. 3 is that: in the present embodiment, the touch module 1100 of the touch display device 1000B further includes a reflection layer 1130, wherein the reflection layer 1130 is disposed between the touch panel 1110 and the film member 1120. In detail, the reflection layer 1130 is disposed in an ink region of the touch panel 1110 (that is, a portion of the peripheral region 1111*b* configured with the ink layer 1113), and is disposed outside the circuit layer 1112 of the touch panel 1110, wherein, the reflection layer 1130 is, for example, a reflector which is composed of Ag or Al, etc., and the reflection layer 1130 disposed in the ink region may be shielded and is not easy to be perceived by the naked eye.

Therefore, when the light 110 irradiates the surface 1120*a* of the film member 1120, in addition to the partial light 110 reflected by the surface 1120*a*, the portion of the light 110 refracted into the film member 1120 also irradiates the first surface 1310*a* through the reflection layer 1130, so that the first adhesive layer 1320 is debonded from the touch module 1100, and thereby damage is avoided in the process of debonding the touch module 1100.

Figure 5:
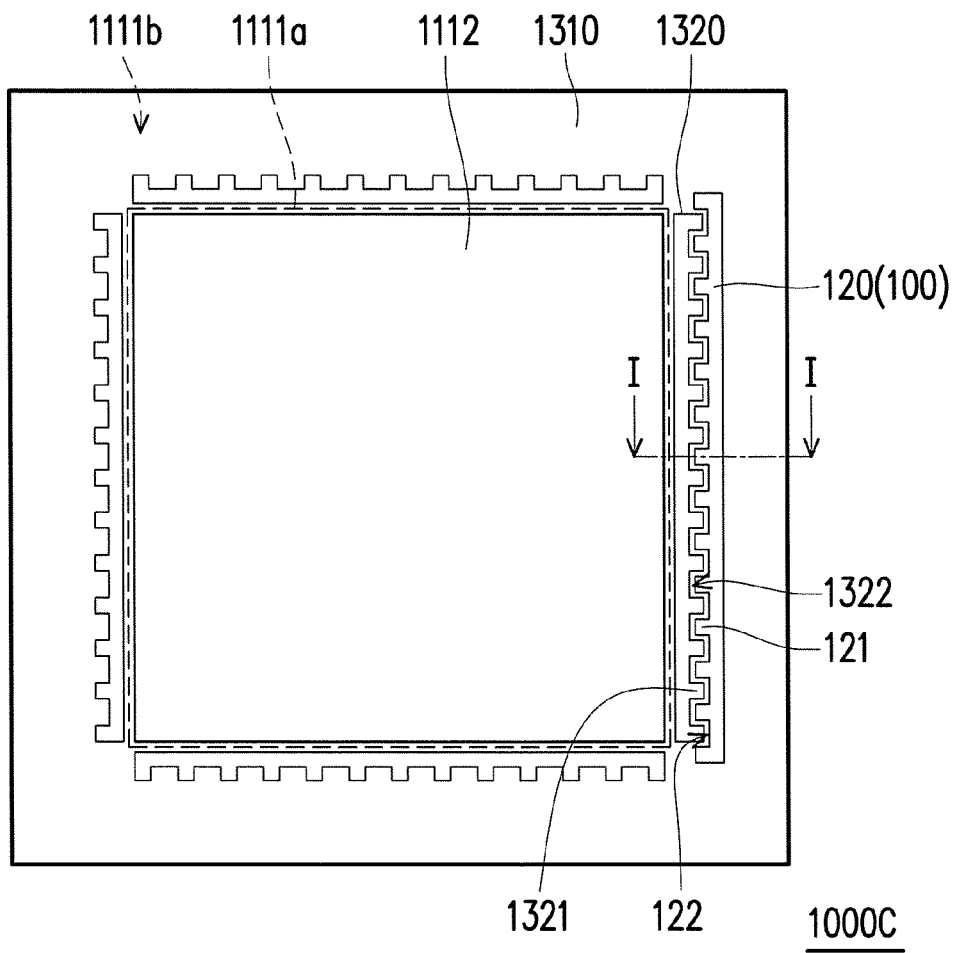
FIG. 5 is a top view diagram illustrating a touch display device according to another embodiment of the present invention.
Figure 6:
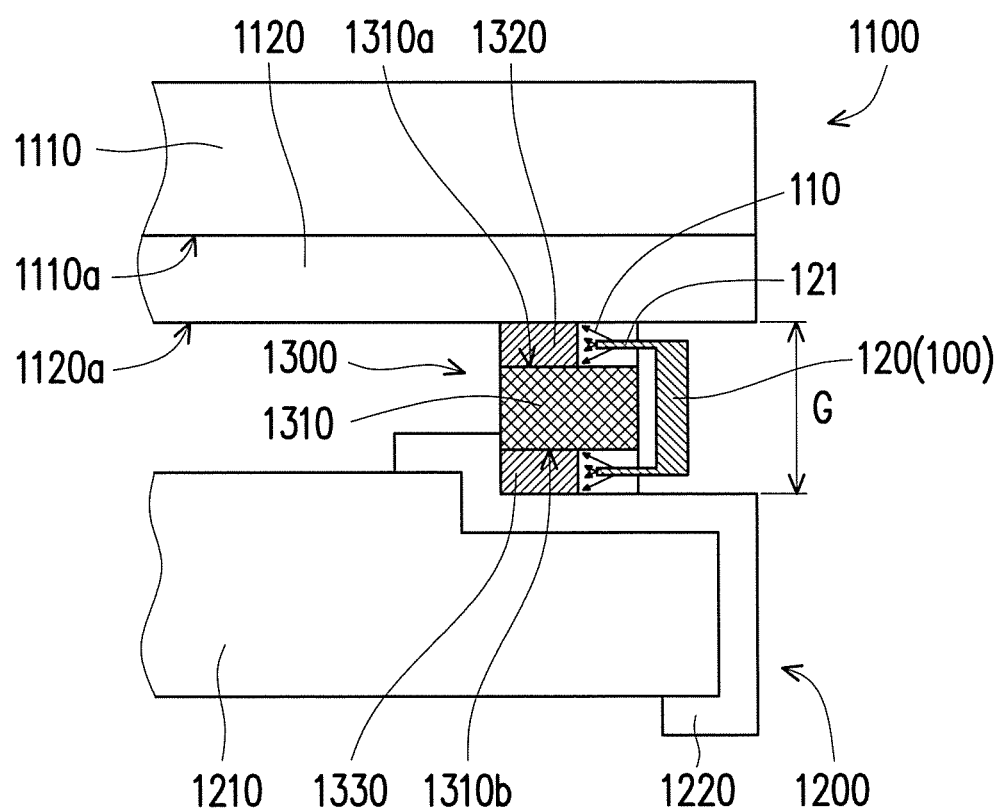
FIG. 6 is a partial cross-sectional view diagram illustrating the touch display device of FIG. 5 along the line I-I.

FIG. 5 is a top view diagram illustrating a touch display device according to another embodiment of the present invention. FIG. 6 is a partial cross-sectional view diagram illustrating the touch display device of FIG. 5 along the line I-I, wherein the circuit layer 1112, the ink layer 1113, the optical adhesive 1114 and the protective layer 1115 are omitted for the clarity and description. Referring to FIG. 5, in the present embodiment, an orthographic projection of the bonding member 1300 of the touch display device 1000C on the touch panel 1110 and an orthographic projection of the outer light source 100 on the touch panel 1110 respectively have zigzag contours which are complementary to each other. That is, the first adhesive layer 1320 and the second adhesive layer 1330 which are coated on the first main body 1310 have zigzag contour shapes, and the outer light source 100 guides the light 110 to irradiate the bonding member 1300 through a light guide structure 120 with a zigzag shape.

Specifically, the light guide structure 120 includes a convex portion 121 and a concave portion 122, and the first adhesive layer 1320 also includes a convex portion 1321 and a concave portion 1322 corresponding thereto, as shown in FIG. 6, wherein, it is appreciated that, in an embodiment which is not illustrated here, the second adhesive layer 1330 has the same contour shape as the first adhesive layer 1320 for corresponding to the light guide structure 120. Herein, this disclosure only illustrates the relative configuration between the light guide structure 120 and the first adhesive layer 1320 as an example.

After the light guide structure 120 is disposed in the gap G, the convex portion 121 thereof is disposed corresponding to the concave portion 1322 of the first adhesive layer 1320, and the convex portion 1321 of the first adhesive layer 1320 is disposed corresponding to the concave portion 122 of the light guide structure 120. Therefore, the light guide structure 120 increases an irradiating area of the light 110 irradiated from the outer light source 100 to make sure that the light 110 is sufficient for the first surface 1310*a*, so that the first adhesive layer 1320 is debonded from the touch module 1100. Similarly, the light 110 also irradiates the second surface 1310*b*, so that the second adhesive layer 1330 is debonded from the display module 1200, and thereby damage is avoided in the process of debonding the display module 1200.

To sum up, in the touch display device of the present invention, the touch module and the display module thereof are bonded to each other through the bonding member therebetween, wherein the bonding member is the LTHC bonding member. Therefore, it is possible to debond the bonding member from the touch module by irradiating the bonding member with the light, which allows the user to debond the touch module and the display module without an excessive force, and thereby avoid damage of the touch module and the display module. In order to make sure that the light irradiates and debonds the bonding member, the present invention increases the amount of the reflected light and the irradiating area through the different refractive indexes of members or by disposing the reflection layer, so that the bonding member can receive sufficient reflected light to be debonded.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch display device comprising:
a touch module comprising a touch panel and a film member bonded to each other;
a display module; and
a bonding member connected between the touch module and the display module, the bonding member forming a gap between the touch module and the display module, and an outer light source being adapted to be disposed in the gap, wherein a light provided by the outer light source irradiates the bonding member through the touch module and debonds the bonding member from the touch module.

2. The touch display device according to claim 1, wherein the bonding member comprises a first main body, a first adhesive layer and a second adhesive layer, wherein the first main body comprises a first surface and a second surface opposite to each other, the first adhesive layer is disposed on the first surface for bonding the film member, and the second adhesive layer is disposed on the second surface for bonding the display module.

3. The touch display device according to claim 2, wherein the touch module further comprises a reflection layer disposed between the touch panel and the film member, and the light irradiates the first surface through the reflection layer.

4. The touch display device according to claim 3, wherein the reflection layer is disposed in an ink region of the touch panel and outside a circuit layer of the touch panel.

5. The touch display device according to claim 2, wherein a refractive index of the touch panel is n1, a refractive index of the film member is n2, and n2 is greater than n1, wherein a portion of the light provided by the outer light source refracted into the film member is reflected by the touch panel to irradiate the first surface through the film member, so as to debond the first adhesive layer from the touch module.

6. The touch display device according to claim 2, wherein the display module comprises a second main body and a fastener, wherein the fastener covers an outer surface of the second main body and exposes a display region of the fastener, and the second adhesive layer is bonded onto the fastener for bonding the display module.

7. The touch display device according to claim 6, wherein a refractive index of the fastener is n3, a refractive index of the second main body is n4, and n3 is greater than n4, wherein a portion of the light provided by the outer light source refracted into the fastener is reflected by the second main body to irradiate the second surface through the fastener, so as to debond the second adhesive layer from the display module.

8. The touch display device according to claim 1, wherein the bonding member is a light-to-heat conversion (LTHC) bonding member.

9. The touch display device according to claim 1, wherein the film member is a proof film.

10. The touch display device according to claim 1, wherein an orthographic projection of the bonding member on the touch panel and an orthographic projection of the outer light source on the touch panel respectively have zigzag contours which are complementary to each other.

* * * * *